United States Patent [19] [11] 3,725,681
Frederiksen [45] Apr. 3, 1973

[54] STABILIZED MULTIVIBRATOR CIRCUIT

[75] Inventor: Thomas M. Frederiksen, Scottsdale, Ariz.

[73] Assignee: Motorola, Inc., Franklin Park, Ill.

[22] Filed: Sept. 1, 1971

[21] Appl. No.: 177,152

Related U.S. Application Data

[63] Continuation of Ser. No. 71,126, Sept. 10, 1970, abandoned.

[52] U.S. Cl. ................307/273, 307/235 R, 307/246, 307/265, 331/111, 331/143

[51] Int. Cl. .....H03k 3/284, H03k 3/282, H03k 5/04

[58] Field of Search......307/272, 273, 246, 265, 266, 307/267, 268, 276, 269, 235; 328/207; 331/143, 144, 113 R, 177, 111

[56] References Cited

UNITED STATES PATENTS 3,353,034 11/1967 Betz et al. ..........................307/273 X
3,665,343 5/1972 Thompson ........................331/113 R
3,693,030 9/1972 Walters ................................307/273

*Primary Examiner*—Herman Karl Saalbach
*Assistant Examiner*—L. N. Anagnos
*Attorney*—Mueller & Aichele

[57] ABSTRACT

An integrated circuit multivibrator provides a stable time constant under varying ambient temperature conditions and with varying supply voltages by commutating a timing capacitor of the multivibrator between matched current source charging circuits. A gating circuit is coupled to the junctions of the timing capacitor with the current sources and supplies an output to a comparator circuit which provides the output pulses from the multivibrator. An astable or free running multivibrator also can be formed with the addition of a bistable circuit to the basic circuit.

15 Claims, 3 Drawing Figures

INVENTOR.
THOMAS M. FREDERIKSEN
BY Mueller & Aichele
ATTORNEYS.

STABILIZED MULTIVIBRATOR CIRCUIT

This is a continuation, of application Ser. No. 71,126, filed Sept. 10, 1970, now abandoned.

BACKGROUND OF THE INVENTION

In the provision of a monostable or astable multivibrator circuit for use in conjunction with other electronic circuits of various types, it is desirable that the timing period of the multivibrator circuit be independent of voltage and temperature variations in order to provide stability of operation of the circuit with which the multivibrator circuit is to be used. It further is desirable to implement the multivibrator circuit to as great an extent as possible as an integrated circuit; and for the most efficient realization of such implementation, it is desirable to reduce the number of capacitors required in the multivibrator circuit to a minimum since such capacitors generally must be located outside the integrated circuit chip on which the rest of the components are formed.

It further is desirable to provide a multivibrator circuit which has minimum susceptibility to high frequency noise and which does not employ a positive feedback which would amplify false triggering caused by such noise.

SUMMARY OF THE INVENTION

Accordingly it is an object of this invention to provide a new and improved multivibrator circuit.

It is an additional object of this invention to provide a voltage and temperature stabilized multivibrator circuit suitable for implementation in integrated circuit form.

It is a further object of this invention to commutate the timing capacitor of a multivibrator between current source charging paths supplying current through the capacitor in opposite directions.

In accordance with a preferred embodiment of this invention, a multivibrator circuit includes a comparator circuit having a reference input, and first and second signal inputs, with a reference voltage being applied to the reference input. A timing capacitor is connected across the first and second signal inputs of the comparator means at first and second junction with first and second charging circuits being connected between a source of operating potential and the first and second junctions, respectively. A switch is provided for alternately connecting the first and second junctions to a point of reference potential to complete a charging path through the capacitor from the first charging circuit when the second junction is connected with the point of reference potential and for completing a charging path through the capacitor from the second charging circuit when the first junction is connected with the point of reference potential.

DETAILED DESCRIPTION

Figure 1:
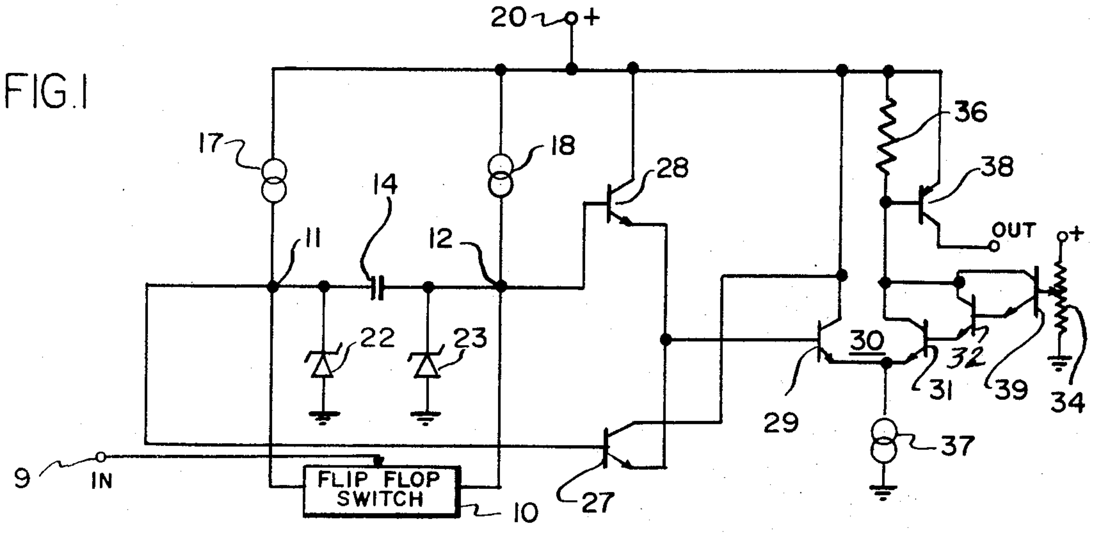
FIG. 1 is a circuit diagram showing a preferred embodiment of the invention.

Referring now to FIG. 1 of the drawing, there is shown a schematic diagram of a monostable multivibrator circuit providing an output pulse for a predetermined length of time after the application of a trigger pulse to an input terminal 9 coupled to a flip-flop switch 10 operating as a single-pole, double-throw switch. For the purpose of understanding the operation of the circuit of FIG. 1, the flip-flop switch 10 may be considered to connect a first junction 11 to ground with the flip-flop switch in a first state of operation, while connecting the second junction 12 to ground with the flip-flop switch 10 in its second state of operation. The junctions 11 and 12 when not connected to ground are essentially presented with an open circuit by the flip-flop switch 10.

Between the junctions 11 and 12 is connected a timing capacitor 14; and charging paths for the timing capacitor 14 are completed through a pair of current sources 17 and 18 connected between the junctions 11 and 12, respectively, and a positive potential supply terminal 20. The circuit shown in FIG. 1 may be fabricated as an integrated circuit with all of the components shown in the drawing being located on the integrated circuit chip with the exception of the timing capacitor 14. In such an integrated circuit, the current sources 17 and 18 may assume a conventional configuration and for that reason have not been shown in detail in FIG. 1. The current sources 17 and 18, however, preferably are matched to provide uniformity of operation of the circuit.

In order to operate the circuit of FIG. 1, assume that the flip-flop 10 initially assumes its first state of operation, causing the junction 11 to be coupled to ground through the flip-flop switch, and the junction 12 to be presented with an open circuit. In this state of operation, the capacitor 14 commences charging through the current source 18, the capacitor 14, the junction 11, and the flip-flop switch 10 to ground. In curve A of FIG. 2 at the time T1 there is shown a change of state in waveform A of output of the flip-flop switch 10, corresponding to the beginning of this cycle of operation. This causes the voltage on the capacitor 14, as seen at junction 12, to rise in accordance with waveform B, with the ramp or rate of charge of the capacitor 14 being dependent upon the parameters of the current source 18 and the remainder of the circuit shown in FIG. 1, the flip-flop switch 10 may assume either of its two states for varying periods of time, including an indefinite period of time for either of the states; so that it would be possible to cause saturation of the current sources 17 or 18, thereby degrading the biasing of the current sources 17 and 18. To prevent this from occuring, a pair of zener diodes 22 and 23 are connected between ground and the junctions 11 and 12, respectively. When the charge on the capacitor 14 exceeds the zener breakdown point of the zener diode 23, further increase in the charge of the capacitor 14 is prevented by the clamping action of the zener diode 23, causing the flat-topped waveform as shown in waveform B of FIG. 2.

Figure 2:
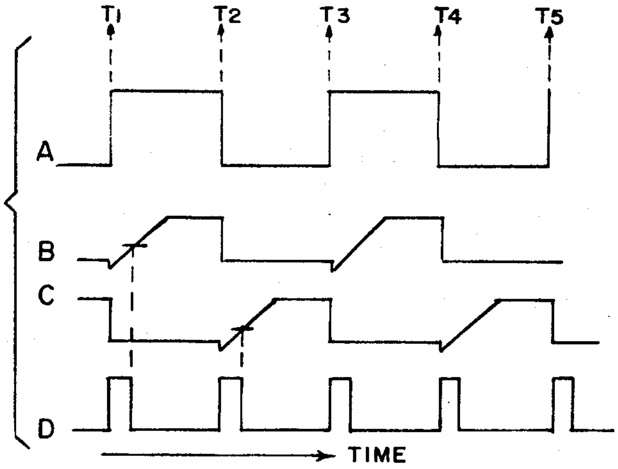
FIG. 2 shows waveforms useful in describing the operation of the circuit shown in FIG. 1.

When the state of the flip-flop switch 10 is changed in accordance with the next input or trigger pulse applied to the terminal 9, as indicated at time T2 in waveform A of FIG. 2, the charging of the capacitor 14 is commutated in the other direction, with charging commencing through the current source 17, the junction 11, the capacitor 14, the junction 12 and the flip-flop 10 to ground. The potentials at the junctions 11 and 12 then appear as shown in the waveforms C and B, respectively, with the charge on the capacitor 14 causing an increasing voltage to appear at the junction 11 as indicated by the ramp shown in waveform C. When the charge on the capacitor exceeds the zener breakdown voltage of the zener diode 22, the charge is clamped to a maximum value as indicated by the flat portion at the end of the ramp in waveform C.

By choosing the current sources 17 and 18 to have identical characteristics and by matching the zener diodes 22 and 23, it is possible to cause symmetrical charging of the capacitor 14 in either direction; so that the ramps of the waveforms B and C are identical. The circuit then may be used to provide output pulses of a predetermined duration each time the capacitor 14 is switched from one charging path to the other. This is effected by connecting the junctions 11 and 12 to a pair of NPN transistors 27 and 28, respectively, forming a zero temperature coefficient linear OR gate. The emitters of the transistors 27 and 28 are coupled together to the base of an input transistor 29, forming one of the two transistors of a differential comparator amplifier 30, including a reference transistor 31. A reference potential is supplied to the base of the transistor 31 by means of a Darlington cascaded transistor pair 32 and 39, forming a Darlington triple with the transistor 31. The base of the transistor 39 is connected to the tap of a potentiometer 34 connected between a source of positive potential and ground, and the transistor 39 provides temperature compensation for the reference voltage. A current source 37 provides operating current for the comparator 30.

When the conductive state of the flip-flop switch 10 is changed, the junction 11 or 12 which previously was at a relatively positive potential level is immediately clamped to ground by the action of the switch 10. The capacitor 14 then immediately discharges by way of the newly conducting flip-flop switch path and the opposite zener diode, which is momentarily rendered forward conducting. Following this discharge, the capacitor 14 commences charging in the opposite direction. The opposite junction experiences an initial negative-going pulse, as indicated at the initial portion of the rising ramps in both of the waveforms B and C of FIG. 2, due to the forward biasing of the zener diode. Thus, at the commencement of each new charging cycle of the capacitor 14, the potentials applied to the bases of the transistors 27 and 28 both are relatively low and are insufficient to bias the transistors 27 and 28 into conduction. Thus, both transistors 27 and 28 are non-conductive. As a consequence, the input transistor 29 of the differential comparator circuit 30 is non-conductive, with the reference transistor 31 being fully conductive through a load resistor 36 coupled between the collector of the transistor 31 and the source of positive potential 20. With current flowing through the resistor 36, a PNP output amplifying transistor 38 is biased into conduction to provide a positive output pulse as indicated in waveform D of FIG. 2. This additional amplification improves the fall time of the output pulse.

When the charge applied to the base of either of the transistors 27 and 28 reaches a level, as determined by the setting of the tap of the potentiometer 34, sufficient to drive the transistor 27 or 28 and the transistor 29 into conduction, the transistor 29 is rendered conductive, with the states of operation of the differential amplifier 30 changing, so that the transistor 31 is rendered non-conductive. This then causes a high positive potential to be applied to the base of the PNP transistor 38, thereby rendering the transistor 38 non-conductive and terminating the output pulse.

Varying the setting of the tap of the potentiometer 34 may be utilized in order to vary the point on the ramp of the waveforms B and C at which the transistor 29 is rendered conductive. This, in turn, varies the width of the output pulses appearing in waveform D. Since the ramps of the waveforms B and C are identical, the output pulses of waveform D are of uniform width, irrespective of which of the OR gate transistors 27 or 28 is controlling the operation of the input to the comparator circuit 30. Each time that the flip-flop 10 changes state to change the direction of charging of the capacitor 14, the preceeding cycle of operation is repeated. Transistor 39 is added to provide temperature compensation and is required since the capacitor 14 does not start a new cycle with zero volts across it due to the zener diode forward voltage drop which results in the discharge path.

By the use of the current sources 17 and 18 for commutating the capacitor between states of charged conditions in either of two directions and by eliminating the positive feedback which is present in conventional one-shot or monostable multivibrators, the one-shot multivibrator configuration shown in FIG. 1 is rendered substantially noise insensitive. The current sources eliminate variations in operation with respect to B+ variations; and additionally are biased by additional circuitry (not shown in FIG. 1) to provide currents which are independent of temperature. The circuit also is rendered temperature stabilized by use of a capacitor 14 which is essentially constant in value over temperature changes. Thus, the circuit may be employed under operating conditions having a widely varying ambient temperature and having a highly fluctuating supply voltage applied to the terminal 20.

Figure 3:
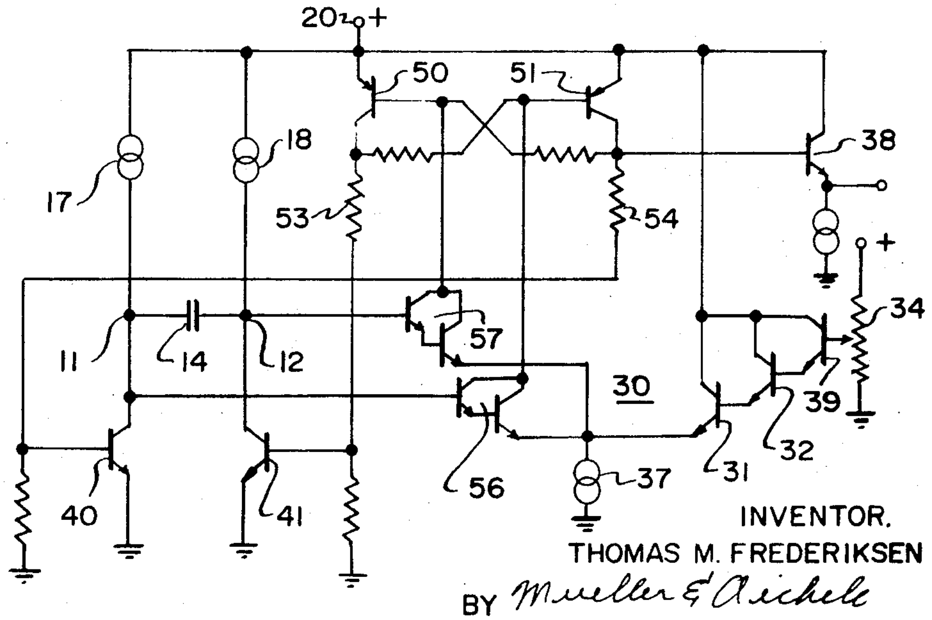
FIG. 3 is a schematic diagram of another embodiment of the invention.

Referring now to FIG. 3, there is shown a modification of the circuit shown in FIG. 1 to change the operation of the circuit from that of a monostable multivibrator to an astable or free-running multivibrator circuit. The circuit components shown in FIG. 3 which are the same or similar to those shown in the circuit in FIG. 1, are given the same reference numbers. The charging and discharging of the capacitor 14 in either of the two directions is effected in the same manner as described above in conjunction with FIG. 1, with the exception that the flip-flop 10 shown in FIG. 1 has been replaced with two NPN switching transistors 40 and 41 which are coupled to the junctions 11 and 12, respectively.

When one or the other of the switching transistors 40 or 41 is conducting, the other of the transistors is non-conductive. Thus, each time that the relative states of conduction of the transistors 40 and 41 are changed, the capacitor 14 discharges and then commences charging in the opposite direction from the respective current source 17 or 18 in the same manner as described above in conjunction with the circuit shown in FIG. 1.

In order to provide an astable or free-running square-wave output from the circuit shown in FIG. 2, an additional bistable multivibrator or flip-flop including a pair of PNP transistors 50 and 51 is employed, with the emitters of the transistors 50 and 51 being connected to the positive supply terminal 20, and with the collector of the transistor 50 being connected through a coupling resistor 53 to the base of the transistor 41 to control the conductivity of the transistor 41 and the collector of the transistor 51 being connected through a coupling resistor 54 to the base of the transistor 40 to control its conduction in a similar manner.

The comparator circuit 30 has been modified to provide a pair of outputs for controlling the operation of the flip-flop 50, 51; so that the junction 11 is coupled to an NPN Darlington amplifier 56, with the emitter of the output transistor of the amplifier 56 being coupled with the emitter of the reference transistor 31 of the differential amplifier 30 to the current source 37. Similarly, another NPN Darlington amplifier 57 is connected to the junction 12, with the emitter of the output transistor of the Darlington amplifier 57 being connected in common with the emitters of the transistors 31 and the output transistor of the amplifier 56 to the current source 37.

The operation of the circuit is similar to that described above in conjunction with FIG. 1, with neither of the Darlington amplifiers 56 and 57 being conductive initially when charging of the capacitor 14 in a new direction commences upon the change of state of the switching transistors 40 and 41. As a result, the reference transistor 31 in the differential amplifier comparator circuit 30 is fully conductive at the beginning of each cycle with the Darlington amplifier circuits 57 and 56 being non-conductive.

Assume for the purposes of illustration that the transistor 41 has just been rendered conductive with the transistor 40 being rendered non-conductive to commence charging the capacitor 14 from the current source 17 to cause a rising voltage ramp to appear on the junction 11. With the transistor 41 being conductive, the junction 12 is clamped to ground; so that the Darlington amplifier 57 remains non-conductive. As the voltage builds up at the junction 11, a point finally is reached which causes the Darlington amplifier 56 to become conductive, with the state of operation of the differential comparator circuit 30 being such that the transistor 31 then becomes non-conductive.

When the Darlington circuit 56 becomes conductive, the potential on the base of the transistor 51 drops, forward-biasing the PNP transistor 51 into conduction, which in turn causes the transistor 50 to be rendered non-conductive in a conventional manner. Conduction of the transistor 51 causes a forward biasing potential to be applied to the base of the transistor 40, rendering that transistor conductive, while at the same time, non-conduction of the transistor 50 renders the previously conductive switching transistor 41 non-conductive.

As a consequence, the capacitor 14 immediately discharges and then commences recharging in the opposite direction through the current source 18, with the junction 11 being clamped to ground potential through the now-conductive transistor 40. A rising ramp of voltage appears on the terminal 12; and when this voltage reaches a point sufficient to forward bias the Darlington circuit 57 into conduction, with the conduction point being determined by the setting of the tap of the potentiometer 34, the transistor 50 is rendered conductive and the transistor 51 is rendered non-conductive. This, in turn causes a reversal of the conductive states of the transistors 40 and 41 and a new cycle of operation is resumed.

The switching back and forth of the two charging paths for the capacitor 14 then continues on a free-running basis to produce a square-wave output from an NPN output transistor 38 connected to the collector of the transistor 51. The output also could be obtained from the collector of the transistor 50, which provides an output which is 180° out of phase with the output provided by the transistor 51. Similarly, if desired, the output could be obtained from the collector of the transistor 31 in a manner similar to the circuit shown in FIG. 1, and described previously.

The Darlington amplifier pairs 56 and 57 are used in the circuit shown in FIG. 3 in place of the single transistors utilized for the OR gates 27 and 28 shown in FIG. 1 in order to isolate the drive of the flip-flop 50, 51 from the input voltage junctions 11 and 12. In addition, in the circuit shown in FIG. 3, the zener diodes 22 and 23 have been eliminated since an upper voltage level clamp is no longer needed; and the parasitic epitaxial-to-substrate isolating diodes which are present at the collectors of the NPN transistors 40 and 41, formed on the integrated circuit, are used to complete the discharge path of capacitor 14. It should be noted that in operation of the circuit shown in FIG. 3, the charge of the capacitor 14 in an opposite direction is initiated prior to attainment of a voltage level which would saturate the current sources 17 or 18 in order to attain the symmetrical square-wave, free-running output.

When the capacitor discharges, the parasitic isolating diode causes the discharge level to reach below ground by the voltage across one diode junction (10); and this is compensated for in the differential amplifier comparator circuit 30 by utilizing the NPN transistor 39 cascaded to the transistors 32 and 31 to form a Darlington triple. The transistor 39 provides temperature matching or compensation for the epitaxial-to-substrate diodes of the transistors 40 and 41. In all other respects, the circuit shown in FIG. 3 operates in substantially the same manner as the circuit shown in FIG. 1 and may be operated over a wide range of ambient temperatures with a wide range of input voltages applied to the terminal 20.

I claim:

1. A multivibrator circuit including in combination:
comparator means having a reference input, first and second signal inputs, and an output;
means for supplying a reference voltage to the reference input of the comparator means;
timing capacitor means coupled across the first and second signal inputs of the comparator means at first and second junctions, respectively;
means for supplying operating potential;
first and second charging circuits coupled between the means for supplying operating potential and the first and second junctions, respectively; and switch means for alternately connecting the first and second junctions with a point of reference potential to complete a charging path through the capacitor means from the first charging circuit with the second junction connected with the point of reference potential and to complete a charging path through the capacitor means from the second charging circuit with the first junction connected with the point of reference potential.

2. The combination according to claim 1 wherein the first and second charging circuits comprise first and second current sources, respectively.

3. The combination according to claim 2 further including first and second zener diode means connected between the first and second junctions, respectively, and the point of reference potential.

4. The combination according to claim 1 further including utilization means coupled with the output of the comparator means, with the comparator means providing an output pulse in response to a change of state of the switch means, the duration of the output pulse supplied to the utilization circuit means being determined by the charging rate of the charging circuit and by the magnitude of the reference voltage supplied to the reference input of the comparator means.

5. The combination according to claim 1 wherein the comparator means comprises a comparator circuit having first and second inputs and an output, said second input thereof corresponding to said reference input, and gate means having a pair of inputs corresponding to said first and second signal inputs and having an output coupled to the first input of the comparator circuit; and the timing capacitor means comprises a timing capacitor.

6. The combination according to claim 5 wherein the gate means comprises a two-input OR gate.

7. The combination according to claim 5 wherein the comparator circuit is a differential amplifier having first and second inputs, with the reference voltage being applied to the first input thereof and with the output of the gate means being applied to the second input thereof.

8. The combination according to claim 7 wherein the first and second charging circuits comprise first and second current sources, respectively.

9. The combination according to claim 8 further including first and second zener diodes coupled between the first and second junctions and the point of reference potential for limiting the maximum charge which may be attained by the capacitor in either direction to prevent saturation of the current sources.

10. The combination according to claim 9 wherein the means for supplying the reference voltage includes means for providing temperature compensation for the forward conducting direction of the zener diodes.

11. The combination according to claim 7 wherein the gate means includes first and second emitter-follower transistors each having collector, base and emitter electrodes, the collector electrodes of which are connected with the source of operating potential and the base electrodes of which are connected, respectively, to the first and second junctions, with the emitter electrodes being connected in common to the second input of the differential amplifier, and wherein the differential amplifier includes third and fourth transistors, each having emitter, base, and collector electrodes with the emitter electrodes being connected together with a point of reference potential and the collector electrode of one of the third and fourth transistors being connected directly with the means for supplying operating potential and the collector electrode of the other of the third and fourth transistors being coupled through a load impedance to the source of operating potential, with the reference voltage being coupled with the base of the fourth transistor and with the emitters of the first and second gate transistors being coupled together with the base of the third transistor of the differential amplifier, the third transistor being rendered conductive whenever the potential being applied to the base thereof by either of the first or second gate transistors attains a predetermined magnitude relative to the magnitude of the reference potential applied to the base of the fourth transistors.

12. A multivibrator circuit according to claim 1 wherein said switch means includes: first and second switches coupled between the first and second junctions, respectively, and the point of reference potential; bistable multivibrator means having first and second outputs for controlling the conductivity of the first and second switch means, respectively, the first switch being conductive and the second switch being nonconductive for one stable state of the bistable multivibrator, and vice-versa for another stable state thereof; and means for coupling the output of the comparator circuit means with the input of the bistable multivibrator means for changing the state thereof, and thereby changing the relative conductivity of the first and second switches each time a predetermined charge is attained on the timing capacitor means in either direction relative to the value of the reference voltage applied to the reference input of the comparator means.

13. The combination according to claim 12 wherein the bistable multivibrator has first and second inputs and the comparator means includes differential amplifier means having at least first, second, and third transistors, each having collector, base, and emitter electrodes, with the first transistor comprising a reference transistor, and the second and third transistors comprising input transistors, the bases of the second and third transistors being coupled with the first and second junctions, respectively, and the base of the reference transistor being supplied with said reference potential, the emitters of the first, second and third transistors being coupled in common with a point of reference potential, and the collector of the reference transistor being coupled with the means for supplying operating potential, the collectors of the second and third transistors being coupled with the first and second inputs of the bistable multivibrator, respectively, so that with the charge on the timing capacitor means in either direction being below a predetermined amount established by the reference potential, the second and third transistors are nonconductive and the reference transistor is conductive, and with a charge attained by the timing capacitor means reaching said predetermined amount, one of the second or third transistors is rendered conductive to change the state of the bistable multivibrator, thereby rendering the previously conductive first or second switch nonconductive and the previously nonconductive first or second switch conductive to reverse the direction of charge of the capacitor means.

14. The combination according to claim 12, wherein the first and second charging circuits comprise first and second current sources, respectively, and the first and second switches comprise first and second switching transistors, each having base, collector, and emitter electrodes with the collector electrodes of the first and second switching transistors being connected with the first and second junctions, respectively, and the emitter electrodes thereof being connected with the point of reference potential, the base electrode of the first switching transistor being coupled with the first output of the bistable multivibrator and the base electrode of the second switching transistor being connected with the second output of the bistable multivibrator, the outputs of the bistable multivibrator being complementary, rendering one of the first and second switching transistor conductive and the other nonconductive for one stable state of operation and rendering the one of the switching transistors nonconductive and the other of the switching transistors conductive for the other stable state of the bistable multivibrator.

15. The combination according to claim 14 wherein the multivibrator circuit is formed as an integrated circuit, with the second and third transistors of the comparator circuit means comprising first and second Darlington amplifier stages and the first reference transistor of the differential amplifier comprising a Darlington triple circuit configuration having three Darlington-connected transistors, with the third transistor thereof providing temperature compensation for the parasitic epitaxial-to-substrate isolating diodes provided at the collectors of the first and second switching transistors.

* * * * *